United States Patent
Mendhekar et al.

(10) Patent No.: US 6,938,073 B1
(45) Date of Patent: Aug. 30, 2005

(54) METHOD AND APPARATUS FOR RE-FORMATTING WEB PAGES

(75) Inventors: Anurag Mendhekar, Sunnyvale, CA (US); Gudrun Socher, Sunnyvale, CA (US); Mohan Vishwanath, San Jose, CA (US)

(73) Assignee: Yahoo! Inc., Santa Clara, CA (US)

( * ) Notice: Subject to any disclaimer, the term of this patent is extended or adjusted under 35 U.S.C. 154(b) by 0 days.

(21) Appl. No.: 09/303,062

(22) Filed: Apr. 30, 1999

Related U.S. Application Data

(63) Continuation-in-part of application No. 09/098,670, filed on Jun. 17, 1998, now Pat. No. 6,216,157, and a continuation-in-part of application No. 08/970,735, filed on Nov. 14, 1997, now Pat. No. 6,108,696.

(51) Int. Cl.$^7$ .............................................. G06F 13/38
(52) U.S. Cl. ....................................... 709/217; 709/204
(58) Field of Search ................................ 709/217, 219, 709/204–206, 238, 245, 203, 208–210; 345/333, 340; 707/513

(56) References Cited

U.S. PATENT DOCUMENTS

| | | | | |
|---|---|---|---|---|
| 5,629,978 A | * | 5/1997 | Blumhardt et al. | 348/552 |
| 5,731,805 A | * | 3/1998 | Tognazzini et al. | 345/156 |
| 5,774,666 A | * | 6/1998 | Portuesi | 709/218 |

(Continued)

FOREIGN PATENT DOCUMENTS

| | | | |
|---|---|---|---|
| WO | WO 97/37202 | 10/1997 | |
| WO | WO 98/15091 | * 4/1998 | H04L/29/06 |
| WO | WO 99/09658 | 2/1999 | |

OTHER PUBLICATIONS

Brooks, C., et al., "Application–Specific Proxy Servers as HTTP Stream Transducers," 4$^{th}$ International World Wide Web Conference, Boston, Dec. 1995.

Fox, A., et al., "Adapting to Network and Client Variability Via On–Demand Dynamic Distillation," University of California at Berkeley, pp. 1–11, 1996.

Liljeberg, M., et al., "Enhanced Services for World–Wide Web in Mobile WAN Environment," University of Helsinki Department of Computer Science, Series of Publications C, No. C–1996–28, pp. 1–12, Apr., 1996.

TechMall, Spyglass, Inc., "Spyglass® Prism Allows Non–PC Devices to Display Content up to Four Times Faster," XP–002157011, pp. 1–2, Sep. 16, 1997.

Spyglass, Inc., "Spyglass Prism, Concepts and Applications," XP002943026, pp. 1–7, 1997.

Bickmore, T.W., et al., "Digestor: device–independent access to the World Wide Web," Computer Networks and ISDN Systems, North Holland Publishing, Amsterdam, NL, XP004095305, vol. 29, No. 8–13, pp. 1075–1082, Sep. 1, 1997.

*Primary Examiner*—Bunjob Jaroenchonwanit
(74) *Attorney, Agent, or Firm*—Fliesler Mayer, LLP

(57) ABSTRACT

Methods and apparatus to selectively display a pre-determined set of contents for a specific class of devices. The apparatus includes an image generator, a section identifier and a section manipulator. The image generator generates an image of a pre-determined rendition of the set of contents; the section identifier identifies a section in the contents based on a preference of the provider of the set of contents; and the section manipulator re-formats the identified section to generate a new rendition, depending on a characteristic of the specific class of devices and a preference of the provider. After the re-formatting, the new rendition is displayed on the specific class of devices.

12 Claims, 12 Drawing Sheets

U.S. PATENT DOCUMENTS

| | | | |
|---|---|---|---|
| 5,848,415 A | 12/1998 | Guck | 707/10 |
| 5,887,133 A * | 3/1999 | Brown et al. | 709/200 |
| 5,890,184 A * | 3/1999 | Ooishi | 707/542 |
| 5,892,758 A * | 4/1999 | Argyroudis | 370/335 |
| 5,940,387 A * | 8/1999 | Humpleman | 370/352 |
| 5,956,737 A * | 9/1999 | King et al. | 707/517 |
| 5,983,263 A * | 11/1999 | Rothrock et al. | 709/204 |
| 6,023,287 A * | 2/2000 | Kimura et al. | 345/719 |
| 6,108,696 A * | 8/2000 | Mendhekar et al. | 709/217 |
| 6,154,771 A * | 11/2000 | Rangan et al. | 709/217 |
| 6,177,930 B1 * | 1/2001 | Chernock et al. | 345/716 |
| 6,182,116 B1 * | 1/2001 | Namma et al. | 709/204 |
| 6,216,157 B1 * | 4/2001 | Vishwanath et al. | 709/208 |
| 6,237,030 B1 * | 5/2001 | Adams et al. | 709/218 |
| 6,240,555 B1 * | 5/2001 | Shoff et al. | 725/110 |
| 6,263,507 B1 * | 7/2001 | Ahmad et al. | 725/134 |
| 6,266,684 B1 * | 7/2001 | Kraus et al. | 707/513 |
| 6,275,825 B1 * | 8/2001 | Kobayashi et al. | 707/9 |
| 6,295,057 B1 * | 9/2001 | Rosin et al. | 345/716 |
| 6,298,482 B1 * | 10/2001 | Seidman et al. | 725/101 |
| 6,304,914 B1 * | 10/2001 | Deo et al. | 709/247 |
| 6,339,780 B1 * | 1/2002 | Shell et al. | 707/526 |
| 6,351,771 B1 * | 2/2002 | Craddock et al. | 709/227 |
| 6,389,437 B2 * | 5/2002 | Stoub | 715/523 |
| 6,421,733 B1 * | 7/2002 | Tso et al. | 709/246 |
| 6,496,693 B1 * | 12/2002 | Tran | 455/426 |

* cited by examiner

| Applications → Appliances ↓ | Browsing the Web | Email | Document Browsing and Editing | E-Commerce | Searching on the Internet |
|---|---|---|---|---|---|
| Television | DocTV, InternetTV | EmailTV, DocTV | DocTV | DocTV, FormTV | DocTV, FormTV |
| Limited Display PDA | DocPDA, InternetPDA | EmailPDA, DocPDA | DocPDA | DocPDA, FormPDA | DocPDA, FormPDA |
| Portable Reader | DocPDR, InternetPDR | EmailPDR, DocPDR | DocPDR | DocPDR, FormPDR | DocPDR, FormPDR |
| Standard Phone | DocPhone, InternetPhone | EmailPhone, DocPhone | DocPhone | DocPhone, FormPhone | DocPhone, FormPhone |
| Phone with Display | Doc$Phone, Internet$Phone | Email$Phone, Doc$Phone | Doc$Phone | Doc$Phone, Form$Phone | Doc$Phone, Form$Phone |

FIG. 4

| Characteristics → Transmission ↓ | Bandwidth | Error Rate | Latency |
|---|---|---|---|
| LAN – Category 5 | High | Low | Medium |
| IEEE 1394 | Very High | Low | Low |
| Universal Serial Bus | High | Low | Low |
| Phone Line (DSL) | High | Low | Medium |
| Power Line (Analog) | Low | High | Low |
| Power Line (Digital) | Low to Medium | Medium | Medium |
| Wireless (Analog 900 MHz) | Low | High | Low |
| Wireless (Digital 900 MHz) | Low | Medium | Medium |
| Wireless (Analog 2.4 GHz) | Medium | Medium | Low |
| Wireless (Digital 2.4 GHz) | Medium | Low | Medium |
| Wireless (Low Bandwidth Digital) | Low | Medium | Medium |

FIG. 6

| Input Type →<br>Compute Power ↓ | Text | Graphics | Natural Image | Audio | Video |
|---|---|---|---|---|---|
| Low | RLE | RLE | HVQ | ADPCM | HVQCR |
| Medium | LZ | LZ | JPEG | MPEG1-Audio | MPEG1 |
| High | LZ | LZ | JPEG | MPEG2-Audio | MPEG2/H.263 |

FIG. 7

| Input Type → Channel ↓ | Text | Graphics | Natural Image | Audio | Video |
|---|---|---|---|---|---|
| Lower Latency | TCP/UDP | TCP/UDP | TCP/UDP | RTP | RTP |
| Higher Latency | UDP | UDP | UDP | RTP | RTP |

FIG. 8A

| Input Type → Channel ↓ | Text | Graphics | Natural Image | Audio | Video |
|---|---|---|---|---|---|
| Lower Latency | TCP | TCP | TCP | RTP | RTP |
| Higher Latency | TCP | TCP | TCP | RTP | RTP |

FIG. 8B

METHOD AND APPARATUS FOR RE-FORMATTING WEB PAGES

This is a continuation-in-part of U.S patent application Ser. No. 09/098,670, filed on Jun. 17, 1998 now U.S. Pat. No. 6,216,157; and Ser. No. 08/970,735, filed on Nov. 14, 1997, now U.S. Pat. No. 6,108,696 both incorporated by reference into this specification.

BACKGROUND OF THE INVENTION

The present invention relates generally to a client-server technology and more particularly to a client-server system with the application delivered to the client being automatically modified based on the resources available.

A server computer may deliver applications to many different types of clients through many different types of media. For example, the server can be delivering a page to a printer through a cable, a note to a pager through radio waves, an audio message to a cellular phone through microwave, a web page to an Internet enabled computer or a palmtop through infrared radiation, a movie to a television through optical fibers, or an on-off command to the switch of a microwave oven or the central air-conditioning system of a house through twisted pairs.

Each of these clients or appliances have different capabilities. Some of them can have relatively powerful microprocessors and memory capacity, such as a palmtop. Others can be ultra-thin clients with minimal computation and memory power, such as a television. The delivery media can be very different. For example, some have large bandwidth, such as optical fibers; but others have low bandwidth, such as twisted pairs. Also, the applications can be quite diverse. For example, a movie requires large bandwidth, low latency, and is quite tolerant to error rates; but an on-off command to a switch has to be absolutely accurate, though the bandwidth requirement is low.

There is typically a specific approach to deliver each type of application through a specific medium to a specific client. For example, if you want to print a page, you will activate a specific printer driver to print that page; and if you want to send a web-page to your Internet enabled computer, your web-page is compressed by a certain pre-determined ratio and is transmitted following a specific network protocol. Different software programs are called by the server to accomplish such diverse tasks.

Whether an Internet enabled computer or a television requests for an interactive application, which is an application that you can interact with, such as a web-page, the server typically follows the same preset network protocol to deliver the interactive application. In other words, if, for example, the transmission medium is changed after the protocol is preset, the server does not have the intelligence to modify the protocol dynamically in view of the change. There is no intelligent adaptability on the part of the server. The server would not know or would not care that a user is sitting one foot away from the web-page on the Internet enabled computer, or is sitting six feet away from the web-page on the television.

Not only does the server lack adaptability, the server would not be able to respond to certain requests from certain clients. For example, the application is a push application, which is an application determined by a user based on her profile, such as quoting the stock price of XEROX at 1 PM everyday. A server would not be able to respond automatically to both a pager requesting for a stock quote, and a standard telephone requesting for a weather report. The way it is typically done nowadays is to have a separate server dedicated to handle each of these tasks.

It should be apparent from the foregoing that there is still a need for an apparatus and method to automatically handle such diverse applications, client capabilities and transmission media, such that different applications can be automatically modified based on the resources available from the transmission media and the clients.

SUMMARY

The present invention is on methods and apparatus that automatically modify an application in view of one or more of the following: the application, and the capability of the client requesting the application and the transmission medium delivering the application. The client can be a palmtop computer showing your new appointment of the day, a microwave oven automatically being turned on at 6 PM to cook your chicken, or a television showing your favorite James Bond movie. Each of these clients has different capabilities connected to different transmission media, and each application has its characteristics. Based on this invention, the server computer automatically modifies the specific application in view of the resources available so as to maximize the benefits of the resources.

In one embodiment, the application can be of an interactive type, such as a web-page, which a user can interact with. This embodiment includes a server apparatus in a server. The server apparatus includes an appliance-specific transducer and an adaptive transmission transducer. The appliance-specific transducer, in view of a client's request for an interactive application in the server, is configured to modify the application based on the client and the application to generate an appliance-specific output. This output is modified automatically depending on the client and the application itself. The adaptive transmission transducer, which is coupled to the appliance-specific transducer, is configured to modify the appliance-specific output. The modification is again based on the application and the corresponding medium of transmission. After the modification, an adapted output is generated, and is delivered through the medium to the client. Then, the client decodes the adapted output to produce a modified version of the interactive application that is adapted for the client.

In another embodiment, the application can be of a push type. A push application is an application that is pre-determined by a user, such as from the user's profile. Based on her preference, as shown in her profile, specific applications can be delivered to her. For example, during weekends, she prefers to wake up at 9 am, and she likes music by the Beetles. So at 9 am every Saturday and Sunday, the server selects a song by the Beetles, compresses it, and delivers it to her speaker next to her bed for fifteen minutes. This embodiment also includes a server apparatus, with its corresponding appliance-specific transducer and adaptive transmission transducer.

Yet another embodiment includes a client apparatus in a client. The client apparatus includes a decoder for generating the modified version of an application from an adapted output. The adapted output is generated by one of the above described appliance-specific transducer and adaptive transmission transducer Based on the present invention, applications are automatically mapped onto various clients based on the resources available. In one embodiment, the resources include the bandwidth, acceptable error rates, and the latency of the transmission medium, and the processing power and memory capacity of a client.

With the present invention, different types of clients can be connected through the same transmission medium, such as a high speed Internet connectivity. The server can modify the applications based on the clients receiving them and based on the applications. Also, with the present invention, different types of clients can be connected through different media, such as wired and wireless, digital and analog; and the server can adapt the applications accordingly.

The client can be ultra-thin, with minimal computing power and memory capacity because the server has already adapted or modified the application for the client. In other words, the client can be a very low-cost device.

Moreover, since applications can be modified by the server to fit specific clients, the same content materials can be used for different clients. For example, the present invention can use the same Internet content for an Internet enabled computer and a television. And these contents can be delivered to different clients in real time.

With the present invention, development time to adapt different applications to a new type of client can be significantly reduced. Changes can be done through software modification based on the present invention. This, in turn, significantly enables widespread deployment of a new type of client into the market place quickly.

Another embodiment of the present invention includes a customization tool to re-format a pre-determined rendition of contents, such as a Web page, for specific classes of devices, based on preferences of content providers or end users or both.

Note that the language used in the specification has been principally selected for readability and instructional purposes, and may not have been selected to delineate or circumscribe the inventive subject matter. Also, the features and advantages described in the specification are not all-inclusive. Other aspects and advantages of the present invention will become apparent to one of ordinary skill in the art, in view of the specification, which illustrates by way of example the principles of the invention.

BRIEF DESCRIPTION OF THE DRAWINGS

FIG. 4 shows examples of appliance-specific transducers in the present invention.

FIG. 6 shows examples of the characteristics of transmission media for the present invention.

FIG. 7 shows examples of ways to select the compression algorithms based on the computation power of the client and the input data type in the present invention.

FIGS. 8A–B show examples of network protocols selected by the adaptive packetizer under different conditions in the present invention.

Figure 1:
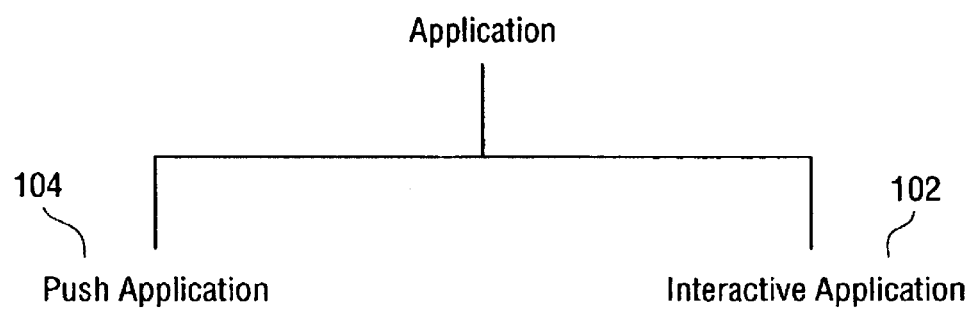
FIG. 1 shows examples of applications applicable to the present invention.

Same numerals in FIGS. 1–11 are assigned to similar elements in all the figures. Embodiments of the invention are discussed below with reference to FIGS. 1–11. However, those skilled in the art will readily appreciate that the detailed description given herein with respect to these figures is for explanatory purposes as the invention extends beyond these limited embodiments.

DETAILED DESCRIPTION OF THE INVENTION

The present invention is applicable to a server-client environment. The server can be connected to one or more clients through the corresponding transmission media. The server can be a personal computer or other types of computers, typically with more computation power and memory than the clients. The clients can be many different types of computing engines; for example, they can be an Internet enabled computer, a television, a palmtop, a microwave oven, a telephone, or a pager. Thus, the capabilities of a client can be quite flexible, as long as it has a decoder to decode the information delivered by the server. In one embodiment, the clients also have some form of user interface apparatus to communicate the decoded information to a user.

In one example, a client requests for an application. This can be done by a user activating his set-top box. He might want to get to YAHOO's web page through his television. This type of application is known as an interactive application, 102 in FIG. 1. In such an application, a user can interact with the application. This is different from just passively watching a STAR TREK episode on the television, because a user cannot change anything in the episode. Anyway, the request is transmitted to the server, which will access the web page. Then the server adapts the accessed web page for the television, with the adaptation depending on a number of factors; for example, the web page itself such as whether the web page contains text, images, video or some combination thereof and the resources available, such as the transmission medium carrying the web page to the client, and the capability of the client. In one embodiment, the web page is modified based on MPEG1 specifications and the RTP network protocols, and is transmitted through an Internet connection from the server to the set-top box of the television. In this case, the client is the television and the set-top box, which receives the transmitted signal, and decodes it. The decoded signals are typically a modified version of the original application. In other words, the decoded application is not exactly the same as the application in the server. Then the set-top box shows the web page on the television, allowing the user to interact with it.

In another embodiment, a user initially enters his preference to the server. This can be the score of the LA Lakers basketball team at the end of each of their games to be shown on her pager screen. Such piece of information is also known as a push application, 104 in FIG. 1; it is preset by the user. When a score is available, the server can deliver it to her pager through radio wave. Again the application can be adapted based on at least one characteristic of the application itself and the resources available.

Figure 2:
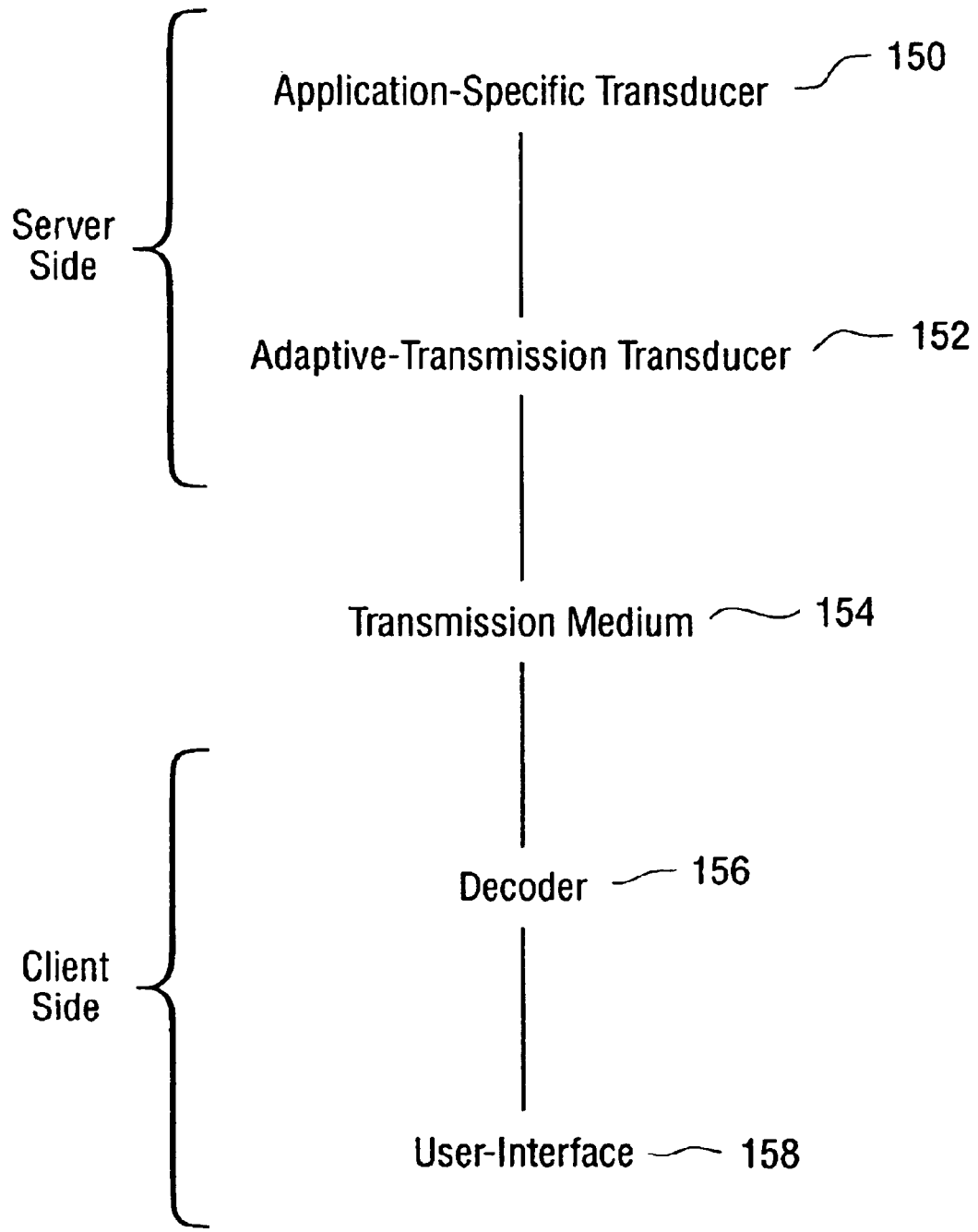
FIG. 2 shows an example of the server side and the client side of the present invention connected through a transmission medium.
Figure 3:
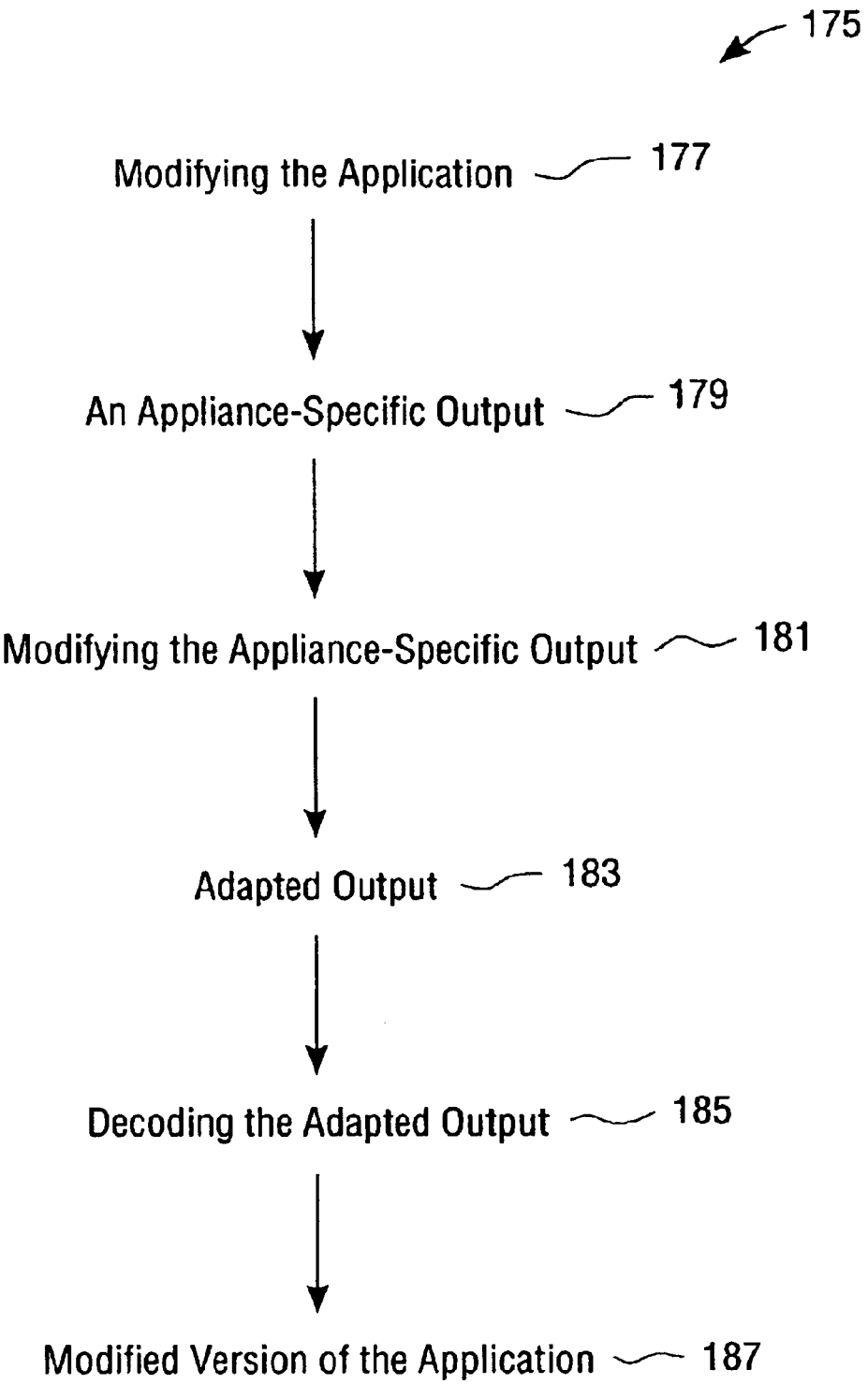
FIG. 3 shows one set of steps to implement one embodiment of the invention.

FIG. 2 illustrates one embodiment of the server side and the client side of the present invention connected through a transmission medium 154. FIG. 3 shows one set 175 of steps to implement one embodiment of the invention.

In one embodiment, the server side includes an appliance-specific transducer 150 and an adaptive-transmission transducer 152. In general terms, the appliance-specific transducer 150 modifies (step 177) an application based on the capability of the client; and the adaptive-transmission transducer 152 further modifies (step 181) the application based on the transmission medium 154. The modification can also depend on the application itself; for example, an audio signal is modified in a different way as compared to apiece of written text. In one embodiment, the client includes a decoder 156 and a user-interface 158. The decoder 156 interprets or decodes (step 185) the delivered signal, which, may have previously been tailored to the capability of the decoder 156. Then, the user-interface 158 presents the modified application 187 to a user.

In one embodiment, the appliance-specific transducer 150 modifies an application based on at least one characteristic of the application in conjunction with the client. For illustration purposes, there are four different types of applications; and they are:

(a) Document or Doc, which includes text and images in their corresponding formats.

(b) Internet, which includes streaming multimedia and plugins.

(c) Email.

(d) Form, which includes different types of forms with different formats for a user to enter information into.

Each of these applications has its characteristics, and can be modified differently depending on the client.

FIG. 4 shows examples of appliance-specific transducers 150 in the present invention. In this specification, a term with an application appended by a client designates an appliance-specific transducer 150 for that application and that client. For example, a DocTV designates an appliance specific transducer for modifying a document for television viewing. This transducer can include a number of sub-transducers, such as a format sub-transducer for TV to change the format of the image depending on the television. This can be changing the size of the text so that a user six feet away can see the text. So there can be one or more of such sub-transducers to adapt the application for television viewing. Note that television is typically watched six or more feet away, while a computer monitor is less than one foot away from a viewer. Other sub-transducers, depending on needs, can be a text sub-transducer to change the text characteristics based upon the client, an image sub-transducer to change the image characteristics based upon the client's display capabilities, and a user-interface sub-transducer to enhance the usability of the application on the client. The appliance-specific transducer 150 can add one or more sub-transducers dynamically to modify the application accordingly.

FIG. 4 shows additional examples of such sub-transducers. For example, if one is browsing the Web using a phone with a display, the appliance-specific transducer 150 can be a DocSPhone, 200, with S in SPhone denoting screen, or an InternetSPhone, 202. The DocSPhone is used if one is just using the phone to passively receive messages, while the InternetSPhone is used if one is using the phone to interact with the messages, as in interacting with a Web page. For another example, if one is using the phone to retrieve email, the appliance-specific transducer 150 can be an EmailSPhone, 204, or a DocSPhone. The EmailSPhone, 204, has additional intelligence in that the phone can have a software management system for email. As a final example, if the phone is used for electronic commerce or E-Commerce, the appliance-specific transducer 150 can be a FormSPhone, 206, which can allow a user to edit a form, as in ordering a book from the Web.

There are different ways to produce such appliance-specific transducers 150. One way is based on methods and apparatus disclosed in the co-pending U.S. patent application Ser. No. 08/970,735, filed on Nov. 14, 1997, to generate such transducers dynamically. Another method can be through direct mapping. For example, a page in HTML can be changed or mapped directly into a bit-map.

In one embodiment, the output from the appliance-specific transducer 150 is an appliance-specific output 179, which is further modified by an adaptive-transmission transducer 152.

The adaptive-transmission transducer 152, based on the characteristics of the application and the transmission medium 154, modifies the appliance-specific output 179 to generate an adapted output 183. In one embodiment, the compression algorithm and the network protocol to be operated on the appliance-specific output 179 depend on at least one characteristic of the application, such as the reliability or error rate of the application required, and the speed or bandwidth of the transmission medium 154. After the appliance-specific output 179 is modified to generate the adapted output 183, the server sends the adapted output 183 through the transmission medium to the client.

Figure 5:
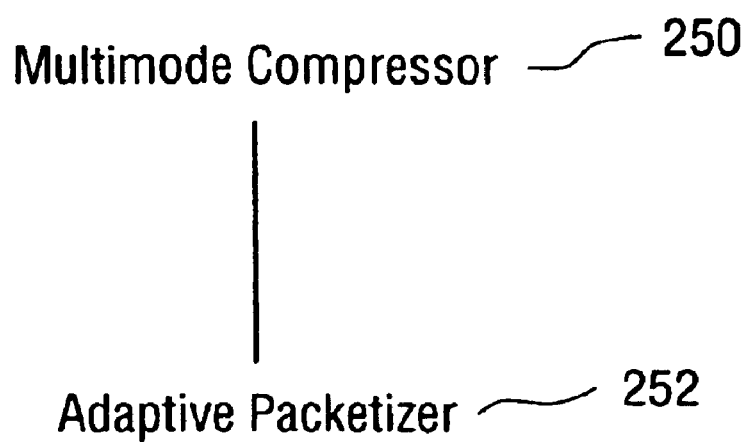
FIG. 5 shows one embodiment of the adaptive transmission transducer of the present invention.

FIG. 5 shows one embodiment of the adaptive-transmission transducer 152 of the present invention. It includes a multimode compressor 250 and an adaptive packetizer 252. The compressor selects the appropriate compression algorithm to compress the appliance-specific output 179, while the adaptive packetizer 252 selects the network protocol to generate the adapted output 183.

FIG. 6 shows examples of the characteristics of transmission media for the present invention. The different characteristics can be in the bandwidth, error rates and latency. Latency represents how long a client has to wait for an application. A medium with a high error rate implies that data going through such a transmission medium 154 tends to have more errors. To compensate for such deficiencies, an application might have to be re-sent to ensure the right signal has been received. This increases latency. For example, an analog signal, 300, transmitted through air—a wireless analog signal—has high error rate, 302, because signal interference can be high. Since the signals might have to be transmitted a number of times to ensure accuracy, the latency of the signal increases, 304. Depending on the application and the transmission medium 154 to be used, the adaptive-transmission transducer 152 automatically takes into account such variations, for example, by selecting the appropriate compression algorithm and network protocol.

In one embodiment, the multimode compressor 250 automatically selects the compression algorithm in view of the application, the transmission medium 154 and the client. The higher the form of data to be sent from the server to the client, the lower the bandwidth required, but the more computation power the client has to have. For example, with respect to ASCII text (a higher form data) and bitmap (a lower form data), the ASCII text document takes less bandwidth to be transmitted, but the client needs the decoding capability to understand the ASCII text. On the other hand, if the document is sent in bitmap, the client displays whatever is received, but the amount of data sent increases significantly. If the client has the capability to decode compressed ASCII text, and if the transmission medium 154 has a small bandwidth, then it is better to compress the ASCII text before transmission. This ensures a more efficient use of the resources.

In one embodiment, the parameters used to choose the compression algorithm include:

(a) Input data type, whether it is text graphics, natural images, audio or video. Note that the application can have a number of different input data type, such as there can be text and images on the same page.
(b) Rate-distortion requirement, or the compromise between bandwidth versus quality.
(c) The transmission medium 154, which affects the bandwidth, error rate and latency.
(d) Capabilities of the server and the client, such as the processing power and memory available.

A number of compression algorithms are applicable to this invention. They include Lempel-Ziv (LZ), Run Length Encoding (RLE), JPEG, Hierarchical Vector Quantization (HVQ), ADPCM MPEG1, MPEG2, H.263 and Hierarchical Vector Quantization with Conditional Replenishment (HVQCR).

FIG. 7 shows ways to select the compression algorithms based on the input data type and the computation power of the client because the decoder 156 might need to decompress the adapted output 183. Note that the computation power of the server may also have to be taken into account because it is the server, or the multimode compressor 250, that is performing the compression. However, typically, the client is not as powerful as the server. If the client has sufficient power to decompress, the server should have sufficient power to compress.

In one embodiment, the adaptive-transmission transducer 152 not only selects the compression algorithm, it also selects the network protocol. This can be done by the adaptive packetizer 252. To illustrate the present invention, three protocols are considered, and they are TCP, UDP and RTP.

FIGS. 8A–B show examples of network protocols selected by the adaptive packetizer 252 under different conditions, with FIG. 8A for low-error rates and FIG. 8B for high-error rates. In one embodiment, the selection again is done in an adaptive manner, with the choice made depending on the data type of the application and the transmission medium 154. For example, if the application is a piece of text and has to be accurate, then error rate has to be low. If the transmission medium has inherently high latency, then as shown in FIG. 8A, UDP is selected. On the other hand, if the application is a video stream, then error rate can be high, but latency should be low because a viewer's enjoyment level drops if there are detectable gaps between frames. Based on FIG. 8B, RTP is selected.

In one embodiment, the client can be ultra-thin. It only needs minimal computing power and memory capacity because the server has lady adapted or modified the application for the client. Such type of clients can be very low cost. An example of a ultra-thin client is a TV set top box that is capable of handling powerful applications, such as streaming audio and video, Java applets and ActiveX controls. Such a box may only require the computing power of a 16 MHz 80386 microprocessor, with 1 Mbyte memory, and with embedded software that can fit into 100 KBytes memory.

Figure 9A:
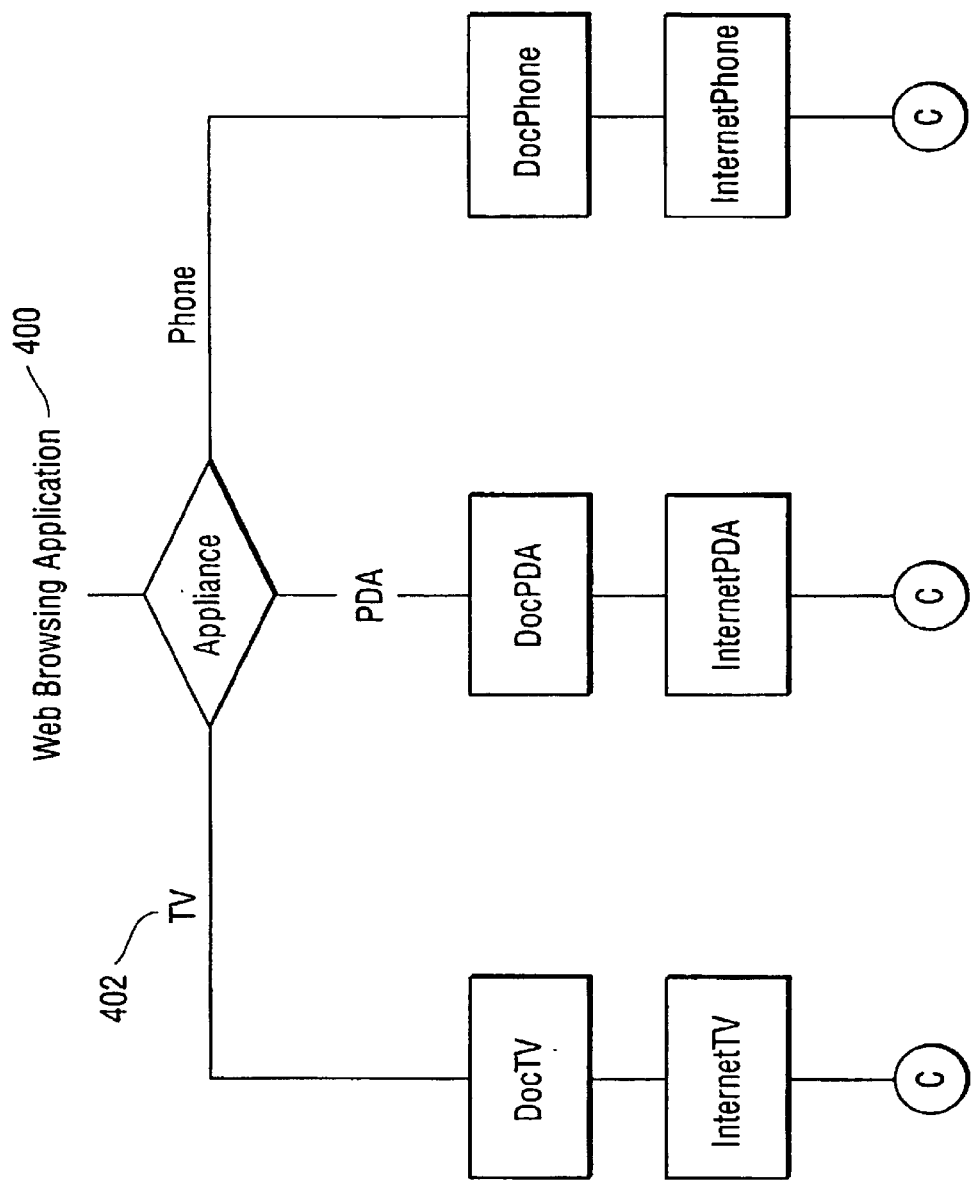
FIGS. 9A–B illustrate an example of a decision tree of the present invention for a Web browsing application.
Figure 9B:
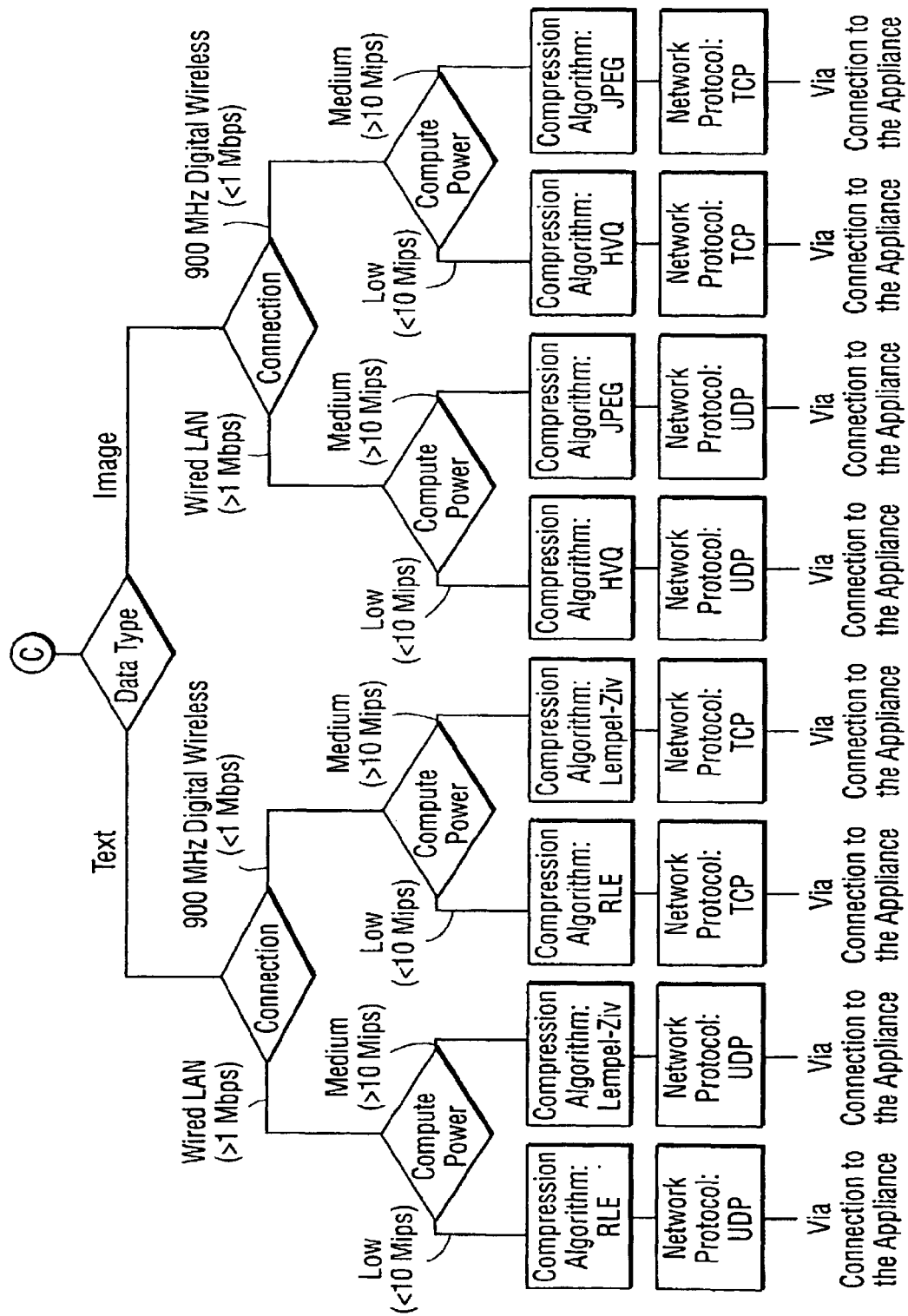

FIGS. 9A–B illustrate an example of a decision tree of the present invention for a Web browsing application 400. As shown in FIG. 9A, if the appliance or the client is a television 402, then the appliance-specific transducer 150 will select the sub-transducers of a DocTV and an InternetTV. The output from the appliance-specific transducer 150 is further modified, as shown in FIG. 9B. For example, a part of the application is a piece of text, so the data type, 404, is text, 406. Also, the transmission medium 154, or the connection 408, is wired LAN, 410, with bandwidth of 10 mega bits per second (Mbps). Further assume that the computing power, 412, of the appliance is low, such as less than 10 million instructions per second (Mips). Then, following the decision tree, the adaptive-transmission transducer 152 will select RLE as the compression algorithm and UDP as the network protocol. After the modification, the output will be transmitted through the wired LAN to the appliance, which in this case is a television 402.

Another embodiment of the invention includes a new type of network protocol. It is an application layer protocol, known as VAP. It runs on top of network protocols, such as the TCP, UDP or RTP. VAP includes two packet types, the Rendered Data Object (RDO) and the Client Data Object (CDO). RDOs are sent from the server to the client in response to a CDO request.

The RDO characteristics include the following:

(a) Each RDO packet is self contained in that it is possible to decode and reproduce a portion of the output based upon each RDO separately. Such a feature is especially suitable to situations with high latency or high error rates. It also permits packets to be delivered out of order.
(b) Each RDO packet contains complete information about the active areas of the screen and corresponding actions.
(c) RDO packets contain information about the compression algorithm used.
(d) VAP permits incremental reconstruction of the output at the client. This is applicable to implement smart-loading which improves the user experience by providing them with some data quickly. RDO packets contain information about the layer of the reconstruction including transparency information.

The CDO characteristics include the following:

(a) Each CDO packet contains an appliance-id, which identifies the client and is specified by the VAP. It is for determining the capabilities of the client so as to allow the server to respond accordingly.
(b) Each CDO packet contains an action and corresponding data.

Figure 10:
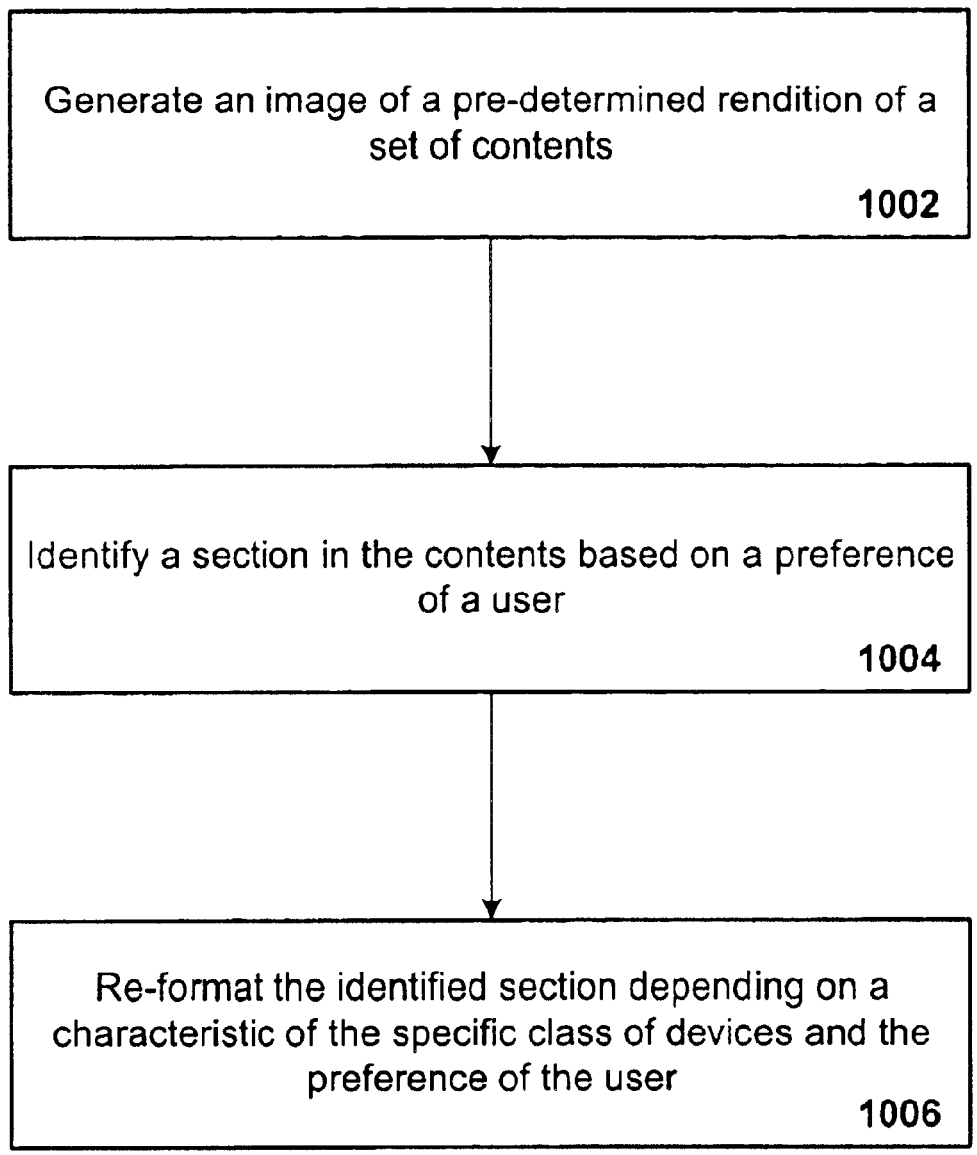
FIG. 10 illustrates a flowchart of a method in accordance with one embodiment of the present invention for re-formatting contents depending on a characteristic of a specific class of device and preference of a user.
Figure 11:
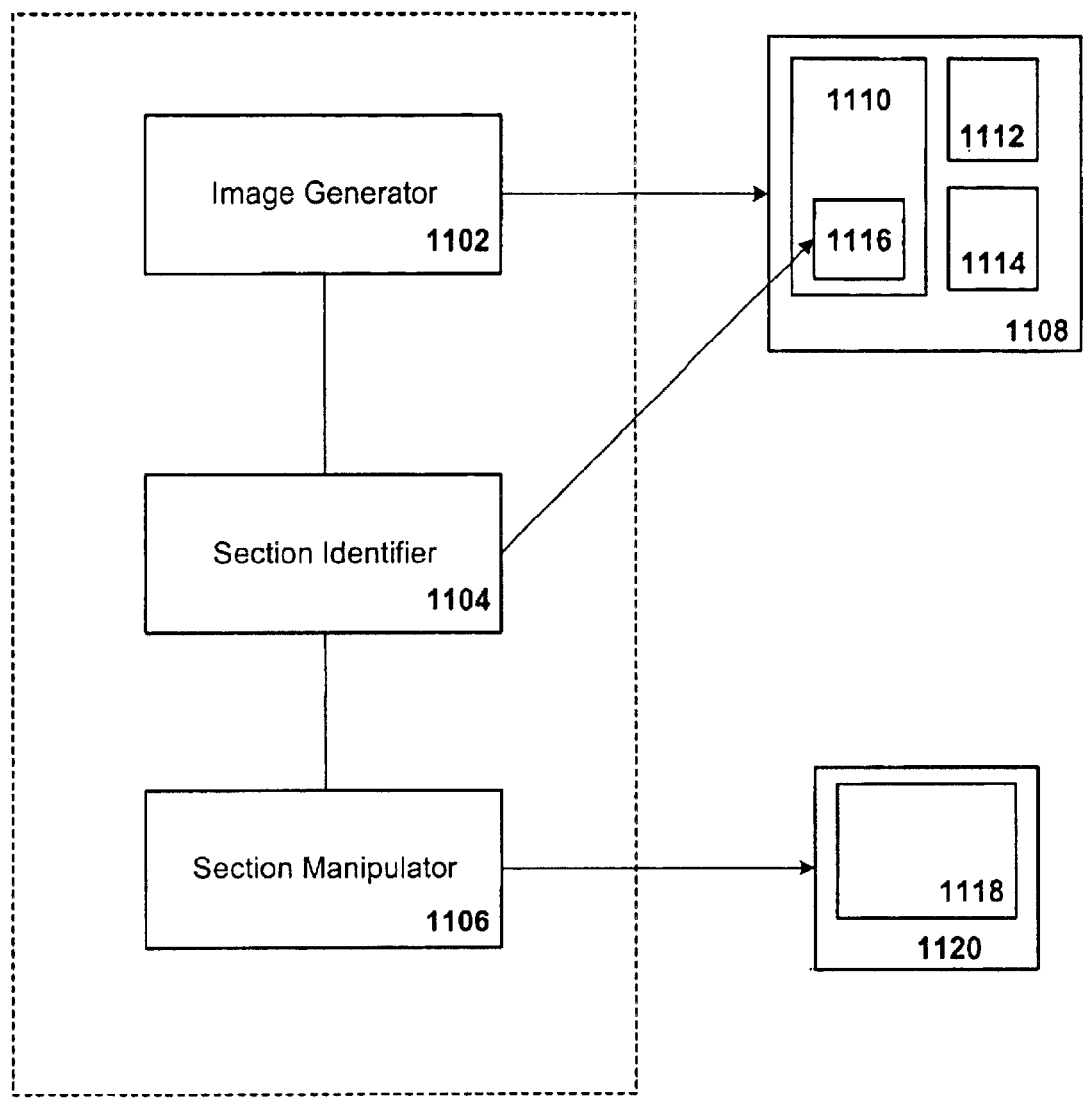
FIG. 11 illustrates a block diagram of various components comprising one embodiment in accordance with the present invention.

As illustrated in FIG. 10 and FIG. 11. one embodiment of the present invention includes an image generator 1102, and a customizer to re-format a pre-determined rendition of contents, such as a Web page, into a new rendition, for a specific class of devices, based on preferences of content providers or end users or both.

One embodiment of re-formatting includes three windows on a display 1108. One window 1110 shows an image of the original rendition of the contents, and another window 1112 shows a preview of the new rendition, which can include the image of the new rendition as shown in a simulated image of the specific class of devices. The images can be generated by the image generator (step 1002). The third window 1114 shows a control panel, which is a user-interface of the customizer, to allow a content provider or an end user to re-format the original rendition.

Using the control panel, a content provider, can identify an area in the original rendition, and place it as a component in the new rendition (step 1004). This can be done in a number of ways. For example, the customizer can include a section identifier 1104 and a section manipulator 1106. The identifier identifies a section 1116 in the original rendition. After the section is identified, the manipulator copies that section, and automatically places it as a component 1118 in the new rendition 1120. This could be achieved through a drag-and-drop metaphor. Based on the section identifier, a user can navigate from section to section in the original rendition, such as moving from the header to the left hand column. If the user wants a particular section, the user can highlight it. The section manipulator can then automatically place a copy of the section into the new rendition in a format selected by the user (step 1006). The format desired can be set by a function key in the control panel. For example, if the original format is in three different columns, by clicking a list key, contents in the columns are transformed into a single list to be placed in the new format. The position of the list can be set by a position key in the control panel.

The new rendition depends on the characteristics of the specific class of devices. For example, if the specific class of devices is a pager, and the section selected is a title with a large font size on the original rendition, the font size of the title can be reduced to fit into the screen of the pager.

Once the user has finished identifying the desired sections, and generated the new rendition, the transformation from the original to the new rendition can be stored in a storage medium. In the future, similar original renditions will be transformed the same way to the same class of devices automatically. Similar renditions can be detected even when the renditions have slightly differing characteristics, such as when sections have been moved around, or additional sections introduced or certain sections that are irrelevant to the reformatting are absent.

In the above description, the re-formatting can be under the control of a content provider. However, an end-user can be in control of the process, or both the end-user and the content provider can control the process.

Thus, users, who can be content providers or end users, can have a pre-determined rendition of contents re-formatted as desired.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided method to selectively display a pre-determined set of contents for a specific class of devices, the method comprising the steps of:

generating an image of a pre-determined rendition of the set of contents for a computer display;

identifying a section in the contents based on a preference of a user;

re-formatting the identified section to generate a new rendition including the identified section, wherein the new rendition is formatted based upon a characteristic of the specific class of devices and the preference of the user; and such that the new rendition can be displayed on the specific class of devices wherein the number of columns is reduced in the new rendition.

2. A computer-aided method as recited in claim 1 wherein the user is selected from the group of an end-user viewing the new rendition and the provider of the set of contents.

3. A computer-aided apparatus to selectively display a pre-determined set of contents for a specific class of devices, the apparatus comprising:

an image generator configured to generate an image of a pre-determined rendition of the set of contents for a computer display;

a section identifier configured to identify a section in the contents based on a preference of a user, a section manipulator configured to re-format the identified section to generate a new rendition including the identified section, wherein the new rendition is formatted based upon a characteristic of the specific class of devices and the preference of the user; and such that the new rendition can be displayed on the specific class of devices wherein the number of columns is reduced in the new rendition.

4. A computer-aided apparatus as recited in claim 3 wherein the user is selected from the group of an end-user viewing the new rendition and the provider of the set of contents.

5. A computer-aided method to selectively display a pre-determined set of contents for a specific class of devices, the method comprising the steps of:

generating an image of a pre-determined rendition of the set of contents for a computer display;

identifying a section in the contents based on a preference of a user;

re-formatting the identified section to generate a new rendition including the identified section, wherein not all of the contents are in the new rendition, wherein the new rendition is formatted based upon a characteristic of the specific class of devices and the preference of the user; and such that the new rendition can be displayed on the specific class of devices, wherein the class of devices is the class of personal digital assistants wherein the number of columns is reduced in the new rendition.

6. A computer-aided method as recited in claim 5 wherein the user is selected from the group of an end-user viewing the new rendition and the provider of the set of contents.

7. A computer-aided apparatus to selectively display a pre-determined set of contents for a specific class of devices, the apparatus comprising:

an image generator configured to generate an image of a pre-determined rendition of the set of contents for a computer display;

a section identifier configured to identify a section in the contents based on a preference of a user;

a section manipulator configured to re-format the identified section to generate a new rendition including the identified section, wherein not all of the contents are in the new rendition, wherein the new rendition is formatted based upon a characteristic of the specific class of devices and the preference of the user; and such that the new rendition can be displayed on the specific class of devices, wherein the class of devices is the class of personal digital assistants wherein the number of columns is reduced in the new rendition.

8. A computer-aided apparatus as recited in claim 7 wherein the user is selected from the group of an end-user viewing the new rendition and the provider of the set of contents.

9. A computer-aided method to selectively display a pre-determined set of contents for a specific class of devices, the method comprising the steps of:

generating an image of a pre-determined rendition of the set of contents for a computer display;

identifying a section in the contents based on a preference of a user;

re-formatting the identified section to generate a new rendition including the identified section, wherein not all of the contents are in the new rendition, wherein the new rendition is formatted based upon a characteristic of the specific class of devices and the preference of the user; and such that the new rendition can be displayed on the specific class of devices, wherein the class of devices is the class of phones wherein the number of columns is reduced in the new rendition.

10. A computer-aided method as recited in claim 9 wherein the user is selected from the group of an end-user viewing the new rendition and the provider of the set of contents.

11. A computer-aided apparatus to selectively display a pre-determined set of contents for a specific class of devices, the apparatus comprising:

an image generator configured to generate an image of a pre-determined rendition of the set of contents for a computer display;

a section identifier configured to identify a section in the contents based on a preference of a user;

a section manipulator configured to re-format the identified section to generate a new rendition including the identified section, wherein not all of the contents are in the new rendition, wherein the new rendition is formatted based upon a characteristic of the specific class of devices and the preference of the user; and such that the new rendition can be displayed on the specific class of devices, wherein the class of devices is the class of phones wherein the number of columns is reduced in the new rendition.

12. A computer-aided apparatus as recited in claim 11 wherein the user is selected from the group of an end-user viewing the new rendition and the provider of the set of contents.

* * * * *